April 12, 1955   C. S. CARNEY ET AL   2,706,080
ANGLE SHIFTER
Filed Nov. 18, 1953

INVENTORS
CHARLES S. CARNEY
BY EDGAR H. FRITZE
ATTORNEY

United States Patent Office 2,706,080
Patented Apr. 12, 1955

2,706,080

ANGLE SHIFTER

Charles S. Carney and Edgar H. Fritze, Cedar Rapids, Iowa, assignors to Collins Radio Company, Cedar Rapids, Iowa, a corporation of Iowa Application November 18, 1953, Serial No. 392,854

5 Claims. (Cl. 235—61)

This invention relates in general to means for shifting the apparent angular position of a shaft in an electromechanical resolver without the necessity of rotating the shaft. Oftentimes in electromechanical resolvers the rotor may be positioned to a particular angle and it may be desirable to add or subtract an angular increment to or from the shaft position. Thus, for example, suppose that a pair of radio omnirange stations are used wherein the magnetic deviation of one of the stations is different from the magnetic deviation of the other station. To obtain a correct fix it is necessary to compensate for this difference in deviation. The present invention allows such corrections to be made without actually rotating the control shaft.

It is an object of this invention therefore to provide electrical means for adjusting the output of an electromechanical resolver which does not necessitate rotation of the input shaft.

Yet another object of this invention is to provide an adding circuit that makes it possible to add or subtract angles to the reference position of an electromechanical resolver.

A feature of this invention is found in the provision for impedance combinations connectible in the output circuit of an electromechanical resolver in combination with summing and difference networks so as to effectively rotate the position of the resolver.

Figure 1:
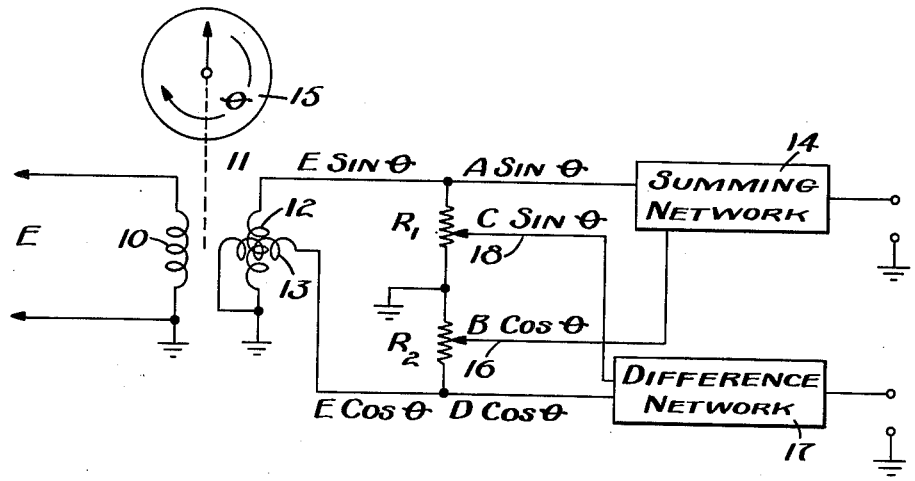
Figure 2:
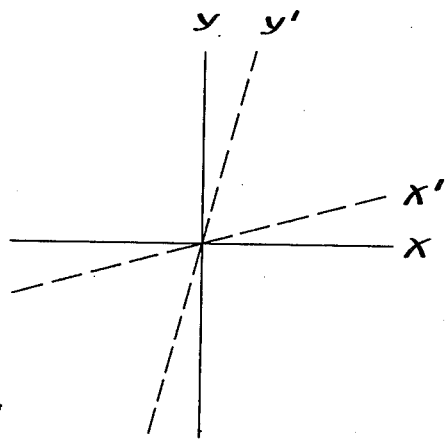

Further features, objects and advantages will become apparent from the following description and claims when read in view of the drawings, in which:

Figure 1 illustrates a synchro resolver in circuit with the angle shifter of this invention; and, Figure 2 illustrates the manner in which axis rotation may occur.

As is well known to those skilled in the art, one function of a synchro type resolver is to produce an output voltage proportional to the sine or cosine functions of the input shaft position. Therefore, for any angular position of the control shaft a trigonometric function of voltage may be obtained.

At times it is desirable to effect a rotation of the shaft to get a voltage corresponding to some other shaft position without actually physically rotating the shaft itself. This may be done electrically as described hereafter. As is well known to those skilled in the art, if an input voltage $E$ is supplied to a synchro resolver, as for example a two-phase type, the output at the windings will be $E \sin \theta$ and $E \cosine \theta$, respectively, where $\theta$ is the angle that defines the shaft position of the rotor.

In Figure 1 a synchro resolver is illustrated which has an input winding 10 that might be connected to an applied voltage $E$. The winding 10 might comprise the rotor which is attached to shaft 11 that may be positioned to any desired angle $\theta$. An indicator 15 might be connected to shaft 11 to indicate the value of $\theta$.

A pair of output windings 12 and 13 are mounted at right angles to each other and might, for example, comprise the stator of the resolver. One of the windings 12 will have a voltage developed across it proportional to $E \sin \theta$, whereas the other winding 13 will have a voltage developed across it proportional to $E$ cosine $\theta$.

The junction point of the windings 12 and 13 is connected to ground. A first resistor $R_1$ is connected between ground and the other side of the winding 12 and a second resistor $R_2$ is connected between ground and the other side of the winding 13.

A summing network 14 receives a first input from the other side of the winding 12 and a second input from a variable slide contact 16 that engages the resistance $R_2$.

A difference network 17 receives a first input from the other side of the winding 13 and a second input from a variable contact 18 which engages the resistor $R_1$.

The output of the summing network 14 will be $E$ sine $(\theta+\phi)$, where $\phi$ is the desired angular rotation and the output of the difference network 17 will be $E$ cosine $(\theta+\phi)$.

This may be proven in the following fashion:
An identity of trigonometry states:

$$A \sin \theta + B \cos \theta = \sqrt{A^2+B^2} \sin (\theta+\phi) \qquad (1)$$

where $\phi$ is the angle whose tangent is $$\frac{B}{A}$$

This may be proven as follows:
Let $\phi$ be defined as the angle whose tangent is $$\frac{B}{A}$$

$$\sin (\theta+\phi) = \sin \theta \cos \phi + \cos \theta \sin \phi \qquad (2)$$

from well known expansion formulae.

$$\sqrt{A^2+B^2} = \frac{A}{\cos \phi} \qquad (3)$$

Multiply (2) by (3)

$$\sqrt{A^2+B^2} \sin (\theta+\phi) = A(\sin \theta + \cos \theta \tan \phi) \qquad (4)$$

or $$\sqrt{A^2+B^2} \sin (\theta+\phi) = A \sin \theta + B \cos \theta \qquad (5)$$

If the voltage $E \sin \theta$ is assumed to equal $A \sin \theta$, then the output of the adding network 14 will be rotated the desired amount, if the voltage proportional to $B \cos \theta$ is obtained by a contact 16 from resistor $R_2$. The voltage $B$ will be chosen so that the quotient of $B \div A$ is equal to the tangent of the angle $\phi$. Suppose, for example, that $A$ is assumed to be 1 and it is desired to shift the sine function 30 degrees. The contact 16 must be set so as to pick off 0.577 of the total voltage across the resistance $R_2$. This is true because 0.577 is the tangent of 30 degrees.

Another identity in trigonometry states that $$C \cos \theta - D \sin \theta \equiv \sqrt{C^2+D^2} \cos (\theta+\phi)$$

where $\phi$ is the angle whose tangent is $$\frac{D}{C}$$

The ratio of $C$ and $D$ may be adjusted by contact 18 on the resistor $R_1$ so as to obtain the desired cosine function. It is interesting to note that the cosine and sine functions may be rotated different amounts in that the sine function depends upon the setting of the contact 16, whereas the cosine function depends upon the setting of the contact 18. Thus, if this invention is used for axis rotation, it may also be used to spread or squeeze the axes together as indicated in Figure 2.

It is seen that this invention provides means for electrically rotating the angular position of a synchro transformer without moving the shaft.

Although it has been described with respect to a preferred embodiment, it is not to be so limited as changes and modifications may be made therein which are within the full intended scope of the invention, as defined by the appended claims.

We claim:

1. Means for shifting the apparent angular position of an electromechanical resolver without the necessity of rotating the shaft comprising an electromechanical resolver with an input winding and a pair of output windings with the output windings mounted at right angles to each other, a control shaft connected to the input winding to rotate it relative to the ouput windings, first ends of each of said output windings connected together, first and second resistors connected in series between the other ends of said output windings, a summing network connected to the other end of the first output winding, a difference network connected to the other end of the second output winding, a first slide contact engageable with the first resistor and connected to the difference network and a second slide contact connected to the second resistor and connected to the summing network.

2. Means for simultating the rotation of the control shaft of an electromechanical resolver comprising an electromechanical resolver having a rotor winding and a pair of stator windings mounted at right angles to each other and with an electrical input supplied to the rotor winding, a control shaft attached to said rotor winding, one end of each output winding connected to ground, a summing network connected to the other end of one of said output windings, a difference network connected to the other end of the second output winding, a first resistor connected between the other end of the first output winding and ground, a second resistor connected between the other end of the second output winding and ground, a first slide contact engageable with the second resistor and electrically connected to said summing network, and a second slide contact engageable with the first resistor and electrically connected to the difference network.

3. Means for simulating the rotation of the control shaft of an electromechanical resolver comprising an electromechanical resolver having a rotor winding and a pair of stator windings mounted at right angles to each other and with an electrical input supplied to the rotor winding, a control shaft attached to said rotor winding, one end of each output winding connected to ground, a summing network connected to the other end of one of said output windings, a difference network connected to the other end of the second output winding, a first resistor connected between the other end of the first output winding and ground, a second resistor connected between the other end of the second output winding and ground, a first slide contact engageable with the second resistor and electrically connected to said summing network, a second slide contact engageable with the first resistor and electrically connected to the difference network, and an output obtainable from the summing network proportional to the sine of an angle equal to the position of the rotor shaft plus the simulated electrical rotation angle.

4. Means for simulating the rotation of the control shaft of an electromechanical resolver comprising an electromechanical resolver having a rotor winding and a pair of stator windings mounted at right angles to each other and with an electrical input supplied to the rotor winding, a control shaft attached to said rotor winding, one end of each output winding connected to ground, a summing network connected to the other end of one of said output windings, a difference network connected to the other end of the second output winding, a first resistor connected between the other end of the first output winding and ground, a second resistor connected between the other end of the second output winding and ground, a first slide contact engageable with the second resistor and electrically connected to said summing network, a second slide contact engageable with the first resistor and electrically connected to the difference network, and an output obtainable from the difference network proportional to the cosine of an angle equal to the sum of the shaft position angle and the synthetic rotation angle.

5. Apparatus for synthetically rotating the shaft position of an electromechanical resolver comprising an electromechanical resolver having a rotor winding and a pair of stator windings mounted at right angles to each other, a control shaft connected to said rotor winding, a summing network connected to the first stator winding, a difference network connected to the second stator winding, a voltage divider circuit connected between the first and second stator windings, a first pickoff connected to said summing network and supplying a portion of the voltage across the second stator winding from said voltage divider, and a second electrical contact connected to the difference network and supplying a portion of said output of the first stator winding from said voltage divider.

No references cited.